(12) United States Patent
Shuai et al.

(10) Patent No.: US 8,525,358 B2
(45) Date of Patent: Sep. 3, 2013

(54) POWER MODULE AND ELECTRONIC DEVICE USING THE SAME

(75) Inventors: Huo-Ming Shuai, Shenzhen (CN); Zhi-Hui Shen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 341 days.

(21) Appl. No.: 12/962,588

(22) Filed: Dec. 7, 2010

(65) Prior Publication Data
US 2012/0091728 A1   Apr. 19, 2012

(30) Foreign Application Priority Data
Oct. 15, 2010  (CN) .......................... 2010 1 0509985

(51) Int. Cl.
*H02K 7/108* (2006.01)
(52) U.S. Cl.
USPC .......................................... 290/1 E; 290/1 R
(58) Field of Classification Search
USPC .......................................................... 290/1 R
See application file for complete search history.

(56) References Cited

U.S. PATENT DOCUMENTS

| | | | | |
|---|---|---|---|---|
| 4,360,860 A | * | 11/1982 | Johnson et al. | 362/192 |
| 6,236,118 B1 | * | 5/2001 | Vasija et al. | 290/1 E |
| 6,288,463 B1 | * | 9/2001 | Tada et al. | 310/75 B |
| 6,291,900 B1 | * | 9/2001 | Tiemann et al. | 290/1 A |
| 6,522,040 B2 | * | 2/2003 | You | 310/96 |
| 6,619,449 B2 | * | 9/2003 | Liao | 191/12.2 R |
| 6,707,191 B1 | * | 3/2004 | Bye | 310/75 A |
| 6,858,951 B2 | * | 2/2005 | Liao | 290/1 C |
| 7,109,594 B2 | * | 9/2006 | Liao | 290/1 C |
| 8,344,693 B2 | * | 1/2013 | Budziszek et al. | 320/114 |
| 2008/0150493 A1 | * | 6/2008 | Bulthaup et al. | 322/1 |
| 2008/0157636 A1 | | 7/2008 | Bulthaup et al. | |
| 2012/0153635 A1 | * | 6/2012 | Tsivicos | 290/1 R |

FOREIGN PATENT DOCUMENTS

| | | | |
|---|---|---|---|
| CN | 201114203 Y | | 9/2008 |
| JP | 08167862 A | * | 6/1996 |
| JP | 10023679 A | * | 1/1998 |
| JP | 2001136707 A | * | 5/2001 |
| JP | 2001189152 A | * | 7/2001 |

* cited by examiner

*Primary Examiner* — Joseph Waks
(74) *Attorney, Agent, or Firm* — Altis Law Group, Inc.

(57) ABSTRACT

A power module is configured to provide power to an electronic device. The module includes a rechargeable battery, an electrical generator, and a driving member. The electrical generator includes a rotor. The driving member is used to drive the rotor to rotate, and includes a mainspring, a receiver to receive the mainspring, and a shaft including one end connected to the mainspring and an opposite end connected to the rotor, enabling the rotor to rotate in union with the shaft. A cable includes one end attached to the shaft with a portion of the cable wound around the shaft. When an opposite end of the cable is pulled, the shaft rotates in a first direction, compressing the mainspring, when the mainspring rebounds, the shaft rotates back in a second direction, and the unwound part of the cable is wound back onto the shaft.

11 Claims, 5 Drawing Sheets

POWER MODULE AND ELECTRONIC DEVICE USING THE SAME

BACKGROUND

1. Technical Field

The present disclosure relates to power modules and electronic devices and, more particularly, to an electronic device having a power module that can be manually operated to charge the device.

2. Description of Related Art

Electronic devices, such as mobile phones, are powered by a battery. The battery needs to be charged periodically. However, when a charger or converter is not at hand, it is impossible to charge the battery, which is inconvenient.

BRIEF DESCRIPTION OF THE DRAWINGS

The components in the drawings are not necessarily drawn to scale, the emphasis instead being placed upon clearly illustrating the principles of the present disclose. Moreover, in the drawings, like reference numerals designate corresponding parts throughout the several views.

DETAILED DESCRIPTION

The disclosure is illustrated by way of example and not by way of limitation. It should be noted that references to "an" or "one" embodiment in this disclosure are not necessarily to the same embodiment, and such references mean at least one.

Figure 1:
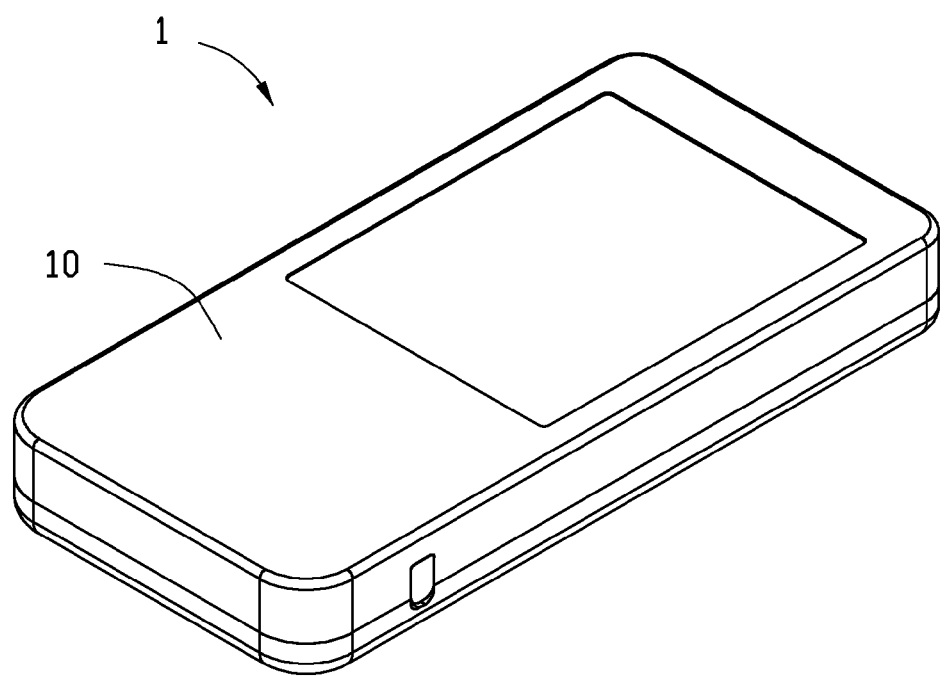
FIG. 1 is an isometric view of an electronic device having a manually operated power module in accordance with an exemplary embodiment.
Figure 2:
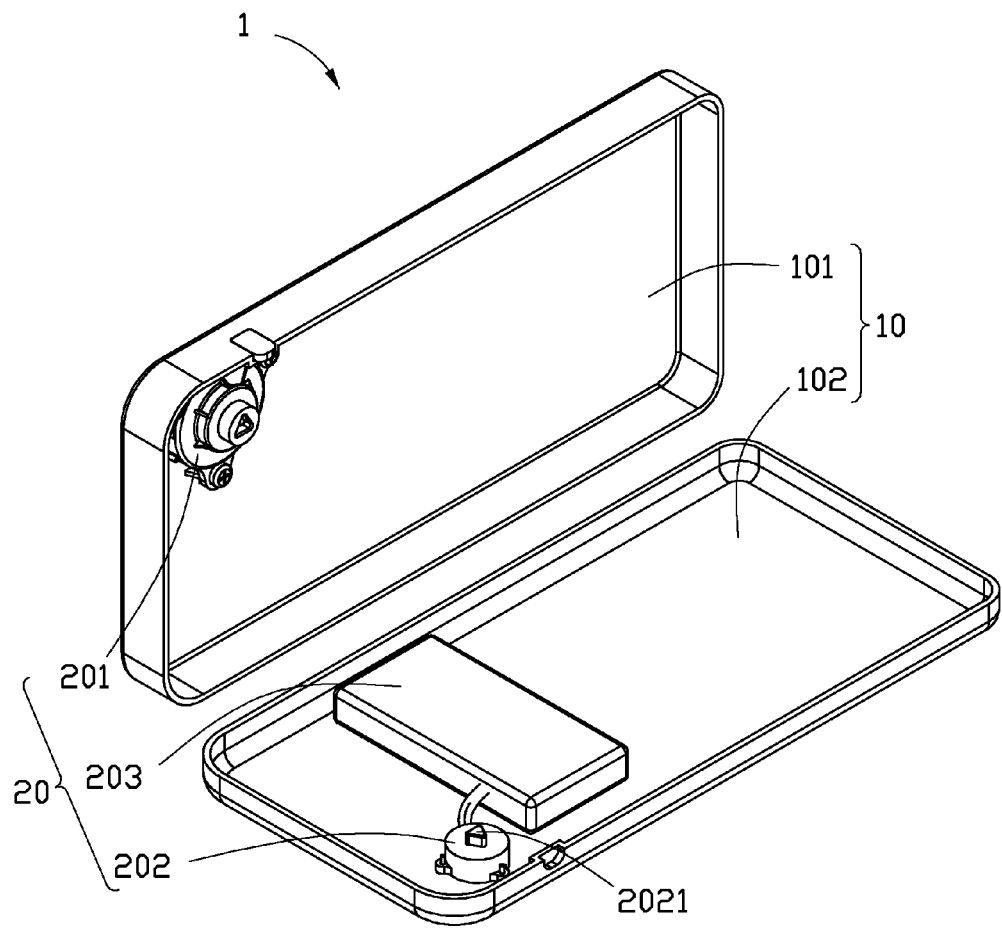
FIG. 2 is an exploded view of the electronic device of FIG. 1.

Referring to FIGS. 1-2, an electronic device 1 includes a main body 10 and a power module 20. The main body 10 accommodates electronic components (not shown) of the electronic device 1. The power module 20 is electrically connected to the main body 10 to provide power to the main body 10 and can be manually operated to produce electricity for charging a rechargeable battery 203 rather than relying on an external power source. In the embodiment, the main body 10 includes a second cover 101 and a first cover 102 that are connected together to form a closed space to receive the power module 20. The device 1 may be a mobile phone, a media player, a camera, or the like.

The power module 20 includes a driving member 201, an electrical generator 202, and a rechargeable battery 203. The rechargeable battery 203 is electrically connected to the electrical generator 202 and the main body 10, to store electricity generated by the generator 202 and provide power to the body 10.

The electrical generator 202 includes a rotor 2021. In the embodiment, the electrical generator 202 includes a number of copper coils (not shown) connected to the rotor 2021 and arranged in a magnetic field (not shown), a rectifier (not shown), and a charging management chip (not shown). When the rotor 2021 rotates, the copper coils are rotated in the magnetic field to generate electricity. The rectifier converts the generated electricity to direct current, and the charging management chip controls and uses the converted direct current to charge the battery 30.

The driving member 201 is connected to the rotor 2021 of the electrical generator 202 to drive the rotor 2021 to rotate.

Figure 3:
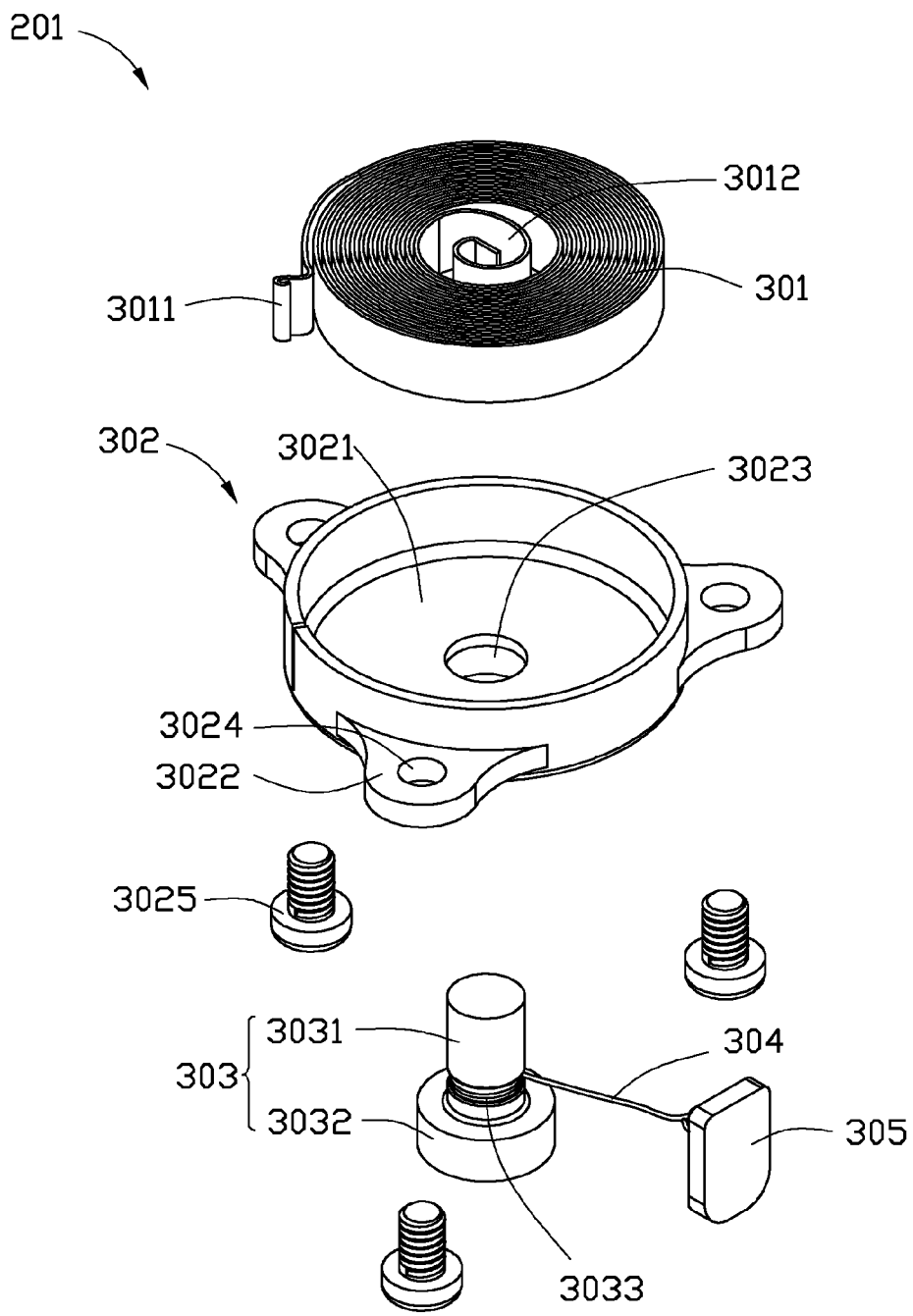
FIG. 3 is an exploded view of a driving member of FIG. 2.
Figure 4:
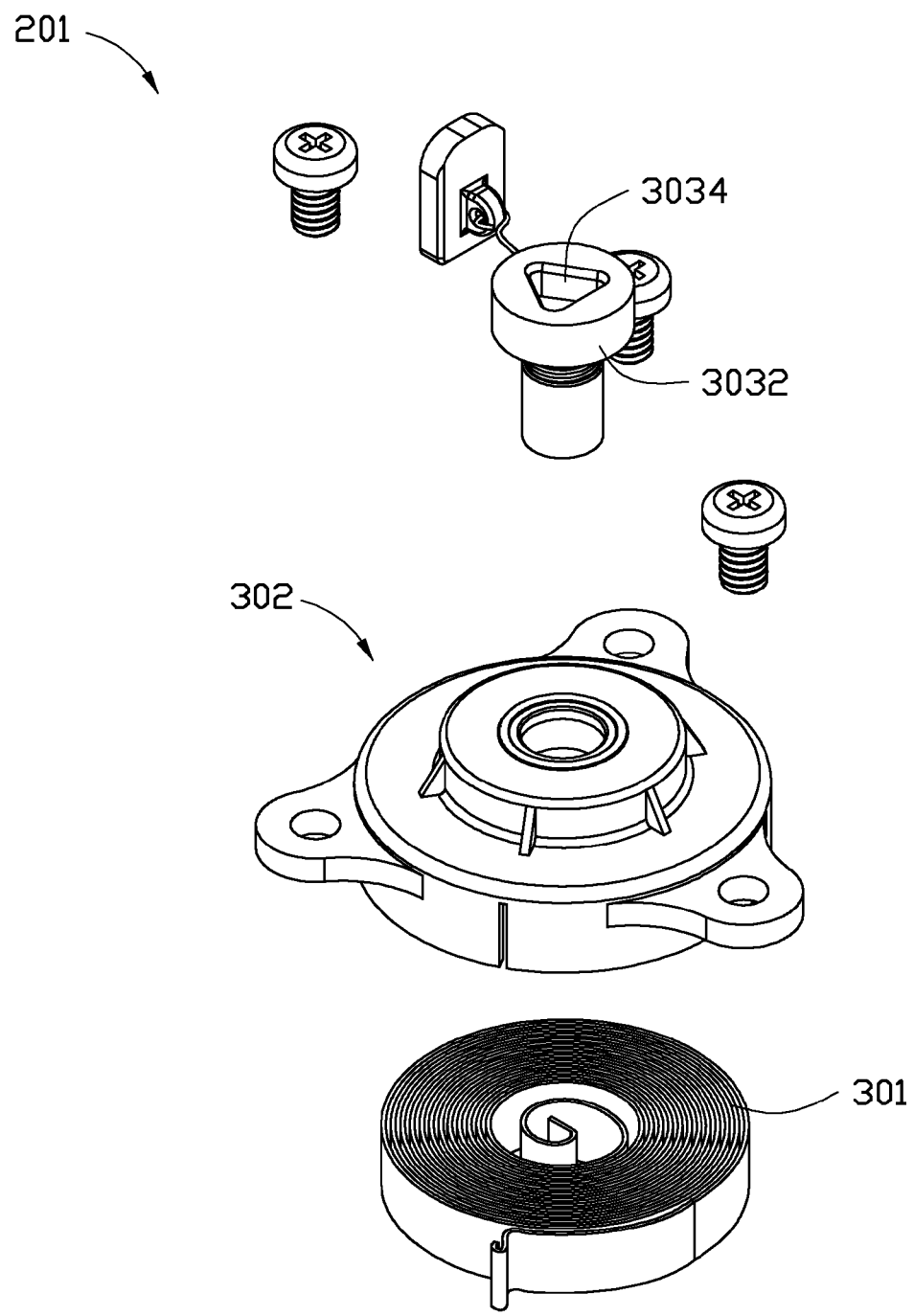
FIG. 4 is similar to FIG. 3, but viewed from another viewpoint.

Referring to FIGS. 3-4, the driving member 201 includes a mainspring 301, a receiver 302, and a shaft 303. The mainspring 301 includes an outside end 3011 and an inside end 3012. The receiver 302 defines a first chamber 3021 to receive the mainspring 301 and a through hole 3023 in the bottom of the chamber 3021. The receiver 302 further includes at least one protrusion 3022 with a through hole 3024 set around the external lateral surface of the chamber 302. The at least one protrusion 3022 is configured to fix the mainspring 301 on the second cover 101 using at least one screw 3025. In the embodiment, the through hole 3023 is arranged at the center of the chamber 3021. The receiver 302 includes three protrusions 3022 symmetrically set around the external lateral surface the chamber 3021.

When the mainspring 301 is received in the receiver 302, the outside end 3011 of the mainspring 301 is attached to an internal lateral surface of the chamber 302, and the inside end 3012 and the through hole 3023 are substantially coaxial.

The shaft 303 is connected to the inside end 3012 of the mainspring 301 and the rotor 2021 of the electrical generator 202. The shaft 302 includes a shaft body 3031 and a head 3032 connected to one end of the shaft body 3031. The free end of the shaft body 3031 passes through the through hole 3023 and is connected to the inside end 3012 of the mainspring 301. The head 3032 defines a second chamber 3034 configured to receive the rotor 2021. When a force acts on the shaft 303 to rotate it, it causes the rotor 2021 to rotate and the mainspring 301 is compressed. When the force is removed, the mainspring 301 rebounds and causes a reverse rotation of the shaft 303.

In the embodiment, the rotor 2021 has a substantially triangular cross section, and the second chamber 3034 is correspondingly shaped to receive the rotor 2021. The shaft body 3031 and the head 3032 are substantially cylindrical, and the through hole 3023 is substantially round. In order to make the shaft 303 rotate smoothly, the diameter of the shaft body 3031 is substantially the same as that of the through hole 3023, and the diameter of the head 3032 is slightly greater than that of the through hole 3023.

Figure 5:
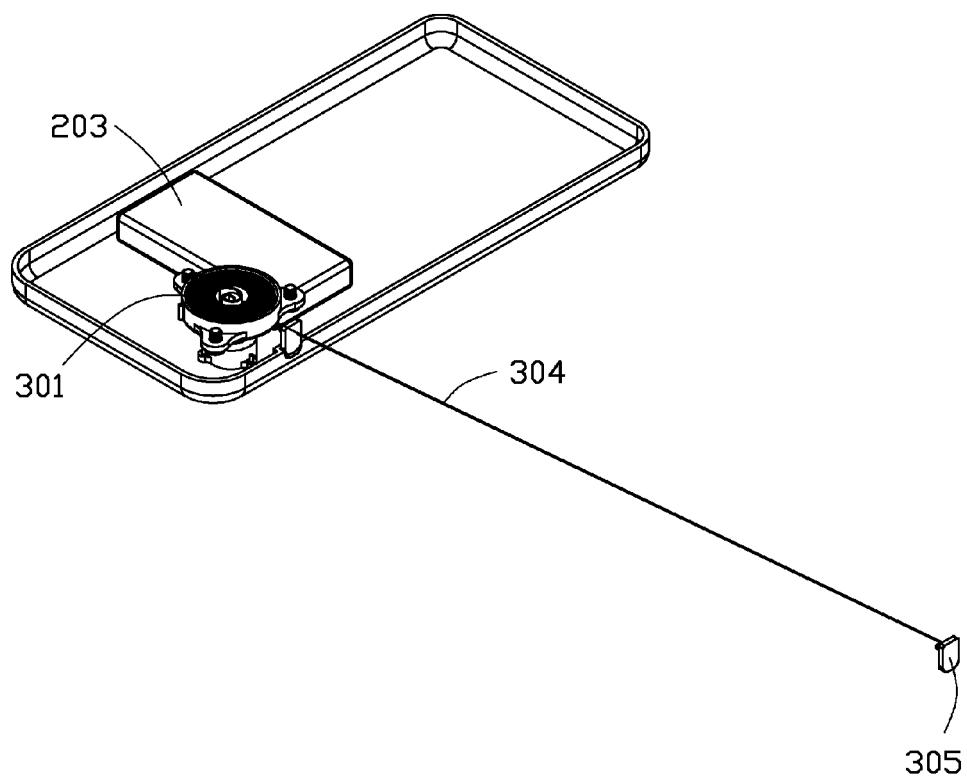
FIG. 5 is a schematic view of the electronic device of FIG. 1, with a battery thereof being charged.

Referring to FIG. 5, the driving member 201 further includes a cable 304. One end of the cable 304 is attached to the shaft 303 with a portion of the cable 304 wound around the shaft 303 at an initial state. When an opposite end of the cable 304 is pulled, the shaft 303 rotates in a first direction, compressing the mainspring 301. When the cable 304 is released, the compressed mainspring 301 rebounds, the shaft 303 rotates backward in a second direction and the unwound part of the cable 304 is wound back onto the shaft 303. Repeating the pulling of the cable 304 will cause the rotator 2021 to keep rotating, and electricity is generated.

In order to ensure the pulling process is smooth, a groove 3033 is formed between the shaft body 3031 and the head 3033 to receive the wound part of the cable 304. A handle 305 is connected to another end of the cable 304.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A power module adapted for an electronic device, comprising:
   a rechargeable battery;
   an electrical generator configured to connect with a first second cover of the electronic device, generate electricity to charge the rechargeable battery, and comprising:
      a rotor configured to rotate to cause the electrical generator to generate electricity; and
   a driving member configured to connect with a second cover of the electronic device, drive the rotor to rotate, and comprising:
      a mainspring comprising an outside end and an inside end;
      a receiver defining a first chamber to receive the mainspring and a through hole in a bottom of the chamber, the outside end of the mainspring being attached to an lateral surface of the chamber;
      a shaft comprising one end passing through the through hole and directly connected to the inside end of the mainspring, and an opposite end connected to the rotor when the first cover is engaged with the second cover, enabling the rotor to rotate in union with the shaft; and
      a cable comprising one end attached to the shaft with a portion of the cable wound around the shaft, wherein when an opposite end of the cable is pulled, the shaft rotates in a first direction, compressing the mainspring, when the mainspring rebounds, the shaft rotates back in a second direction, and the wound part of the cable is wound back to the shaft.

2. The power module as described in claim 1, wherein the shaft comprises a shaft body and a head at one end of the shaft body, a free end of the shaft body is connected to the inside end of the mainspring, and the head is connected to the rotor.

3. The power module as described in claim 2, wherein the head defines a second chamber to receive the rotor.

4. The power module as described in claim 2, wherein the shaft body and the head are cylindrical, and the through hole is round.

5. The power module as described in claim 1, wherein the through hole is arranged in the center of chamber.

6. An electronic device comprising:
   a main body comprising:
      a first cover and a second cover; and
   a power module configured to provide power to the main body, comprising:
      a rechargeable battery electrically connected to the main body;
      an electrical generator connected with the first cover, and configured to generate electricity to charge the rechargeable battery, and comprising:
         a rotor configured to rotate to cause the electrical generator to generate electricity; and
      a driving member connected with the second cover, and configured to drive the rotor to rotate, and comprising:
         a mainspring comprising an outside end and an inside end;
         a receiver defining a first chamber to receive the mainspring and a through hole in a bottom of the chamber, the outside end of the mainspring being attached to an lateral surface of the chamber;
         a shaft comprising one end passing through the through hole and directly connected to the inside end of the mainspring, and an opposite end connected to the rotor when the first cover is engaged with the second cover, enabling the rotor to rotate in union with the shaft; and
         a cable comprising one end attached to the shaft with a portion of the cable wound around the shaft, wherein when an opposite end of the cable is pulled, the shaft rotates in a first direction, compressing the mainspring, when the mainspring rebounds, the shaft rotates back in a second direction, and the wound part of the cable is wound back to the shaft.

7. The electronic device as described in claim 6, wherein the shaft comprises a shaft body and a head at one end of the shaft body, a free end of the shaft body is connected to the inside end of the mainspring, and the head is connected to the rotor.

8. The electronic device as described in claim 7, wherein the head defines a second chamber to receive the rotor.

9. The electronic device as described in claim 7, wherein the shaft body and the head are cylindrical, and the through hole is round.

10. The electronic device as described in claim 6, wherein the through hole is arranged in the center of chamber.

11. The electronic device as described in claim 6, wherein the device is a mobile phone, a media player or a camera.

* * * * *